US00RE44458E

(19) United States
(12) Reissued Patent
Perell

(10) Patent Number: US RE44,458 E
(45) Date of Reissued Patent: *Aug. 27, 2013

(54) ACCESS STRUCTURE WITH BURSTING DETONATOR FOR OPENING A SEALED PACKAGE

(76) Inventor: William Simon Perell, San Francisco, CA (US)

( * ) Notice: This patent is subject to a terminal disclaimer.

(21) Appl. No.: 12/695,691

(22) Filed: Jan. 28, 2010

Related U.S. Patent Documents

Reissue of:
(64) Patent No.: 7,306,371
Issued: Dec. 11, 2007
Appl. No.: 11/010,915
Filed: Dec. 14, 2004

U.S. Applications:
(60) Division of application No. 12/184,809, filed on Aug. 1, 2008, now Pat. No. Re. 41,273, and a continuation-in-part of application No. 10/831,964, filed on Apr. 26, 2004, now Pat. No. 6,938,394, which is a continuation-in-part of application No. 10/246,893, filed on Sep. 19, 2002, now Pat. No. 6,726,364.

(51) Int. Cl.
*B65D 33/00* (2006.01)

(52) U.S. Cl.
USPC ..... 383/210; 383/61.1

(58) Field of Classification Search
USPC ..... 383/202, 210, 211, 61.1, 38, 39, 383/40, 107
See application file for complete search history.

(56) References Cited

U.S. PATENT DOCUMENTS

| | | | |
|---|---|---|---|
| 2,916,886 | A | 12/1959 | Robbins |
| 3,074,544 | A | 1/1963 | Bollmeier et al. |
| 3,120,336 | A | 2/1964 | Whatley, Jr. |

(Continued)

FOREIGN PATENT DOCUMENTS

| | | |
|---|---|---|
| DE | 20314741 | 1/2004 |
| EP | 00306207 A1 | 3/1989 |

(Continued)

OTHER PUBLICATIONS

Machine translation of European Patent Office Document No. 0 709 302. Translated on Dec. 3, 2012.*

(Continued)

*Primary Examiner* — Jes F Pascua
(74) *Attorney, Agent, or Firm* — Dority & Manning, PA

(57) ABSTRACT

Breaching access structure 10S provides easy access to sealed interior 10I containing contents 10C. Access region 12A proximate edge 12E of package 10, provides entrance into the interior and access to the contents. Band seal 14 formed by upper lamina 14U and lower lamina 14L extends along the access region, enclosing breaching bubble 16. The band seal has inner seal portion 14I between the bubble and the interior, and outer seal portion 14O between the bubble and edge 12E of the package. The bubble is expandable to open the package in response to bursting detonator 18. The detonator is burst by external pressure applied by a user. Opposed pair of peel flaps, upper flap 16U and lower flap 16L, are formed by the opposed laminae of the outer seal along the edge breach as the bubble breaches. These small initial flaps are grasped by the user and manually peeled apart to initiate opening the band seal.

11 Claims, 2 Drawing Sheets

(56) References Cited

U.S. PATENT DOCUMENTS

| | | | | |
|---|---|---|---|---|
| 3,189,227 | A | 6/1965 | Hobbs et al. | |
| 3,256,981 | A | 6/1966 | Kurtz | |
| 3,294,227 | A | 12/1966 | Schneider et al. | |
| 3,301,390 | A | 1/1967 | Via, Jr. | |
| 3,342,326 | A | 9/1967 | Zackheim | |
| 3,394,802 | A * | 7/1968 | Hershaft | 206/457 |
| 3,419,137 | A | 12/1968 | Walck, III | |
| 3,573,069 | A | 3/1971 | Keller et al. | |
| 3,608,709 | A | 9/1971 | Pike | |
| 3,635,376 | A | 1/1972 | Hellstrom | |
| 3,921,805 | A | 11/1975 | Compere | |
| 3,964,604 | A | 6/1976 | Prenntzell | |
| 4,275,840 | A | 6/1981 | Staar | |
| 4,301,923 | A | 11/1981 | Vuorento | |
| 4,375,383 | A | 3/1983 | Sewell et al. | |
| 4,402,402 | A | 9/1983 | Pike | |
| 4,485,920 | A | 12/1984 | Skylvik | |
| 4,496,046 | A * | 1/1985 | Stone et al. | 206/219 |
| 4,511,052 | A | 4/1985 | Klein et al. | |
| 4,519,499 | A * | 5/1985 | Stone et al. | 206/219 |
| D279,808 | S | 7/1985 | Pharo | |
| 4,540,089 | A | 9/1985 | Maloney | |
| 4,597,244 | A | 7/1986 | Pharo | |
| 4,610,684 | A | 9/1986 | Knox et al. | |
| 4,632,244 | A | 12/1986 | Landau | |
| 4,704,314 | A | 11/1987 | Hsu et al. | |
| 4,711,359 | A | 12/1987 | White et al. | |
| 4,759,472 | A | 7/1988 | Strenger | |
| 4,793,123 | A | 12/1988 | Pharo | |
| 4,798,288 | A | 1/1989 | Holzner | |
| 4,859,521 | A | 8/1989 | Pike et al. | |
| 4,872,556 | A | 10/1989 | Farmer | |
| 4,872,558 | A | 10/1989 | Pharo | |
| 4,874,093 | A | 10/1989 | Pharo | |
| 4,889,884 | A | 12/1989 | Dust et al. | |
| 4,890,744 | A | 1/1990 | Lane, Jr. et al. | |
| 4,918,904 | A | 4/1990 | Pharo | |
| 4,949,530 | A | 8/1990 | Pharo | |
| 4,961,495 | A | 10/1990 | Yoshida et al. | |
| 5,050,736 | A | 9/1991 | Griesbach | |
| 5,100,028 | A | 3/1992 | Siefert | |
| 5,114,004 | A | 5/1992 | Isono et al. | |
| 5,126,070 | A | 6/1992 | Leifheit et al. | |
| 5,131,760 | A | 7/1992 | Farmer | |
| 5,137,154 | A | 8/1992 | Cohen | |
| 5,207,320 | A | 5/1993 | Allen | |
| 5,215,221 | A | 6/1993 | Dirksing | |
| 5,272,856 | A | 12/1993 | Pharo | |
| 5,325,968 | A | 7/1994 | Sowden | |
| 5,373,966 | A | 12/1994 | O'Reilly et al. | |
| 5,411,496 | A * | 5/1995 | Homa | 604/333 |
| 5,427,830 | A | 6/1995 | Pharo | |
| 5,445,274 | A | 8/1995 | Pharo | |
| 5,447,235 | A | 9/1995 | Pharo | |
| 5,487,470 | A | 1/1996 | Pharo | |
| 5,492,219 | A | 2/1996 | Stupar | |
| 5,564,591 | A | 10/1996 | Christine | |
| 5,588,532 | A | 12/1996 | Pharo | |
| D386,074 | S | 11/1997 | Pharo | |
| 5,711,691 | A | 1/1998 | Damask et al. | |
| 5,775,491 | A | 7/1998 | Taniyama | |
| 5,792,213 | A | 8/1998 | Bowen | |
| 5,814,159 | A | 9/1998 | Paley et al. | |
| 5,824,392 | A | 10/1998 | Gothoh | |
| 5,865,309 | A | 2/1999 | Futagawa et al. | |
| 5,870,884 | A | 2/1999 | Pike | |
| 5,910,138 | A | 6/1999 | Sperko et al. | |
| 5,928,213 | A | 7/1999 | Barney et al. | |
| 5,944,709 | A | 8/1999 | Barney et al. | |
| 5,967,308 | A | 10/1999 | Bowen | |
| 6,001,187 | A | 12/1999 | Paley et al. | |
| 6,007,264 | A | 12/1999 | Koptis | |
| 6,036,004 | A | 3/2000 | Bowen | |
| 6,068,820 | A | 5/2000 | De Guzman | |
| 6,165,161 | A | 12/2000 | York et al. | |
| 6,198,106 | B1 | 3/2001 | Barney et al. | |
| 6,203,535 | B1 | 3/2001 | Barney et al. | |
| 6,290,801 | B1 | 9/2001 | Krampe et al. | |
| 6,468,377 | B1 | 10/2002 | Sperko et al. | |
| 6,491,159 | B2 | 12/2002 | Shibata | |
| 6,547,468 | B2 | 4/2003 | Gruenbacher et al. | |
| 6,658,400 | B2 | 12/2003 | Perell et al. | |
| 6,692,150 | B2 | 2/2004 | Hoshino | |
| 6,726,364 | B2 | 4/2004 | Perell | |
| 6,846,305 | B2 | 1/2005 | Smith et al. | |
| 6,935,492 | B1 | 8/2005 | Loeb | |
| 6,938,394 | B2 | 9/2005 | Perell | |
| 6,968,952 | B2 | 11/2005 | Crevier et al. | |
| 6,996,951 | B2 | 2/2006 | Smith et al. | |
| 7,004,354 | B2 | 2/2006 | Harper | |
| 7,051,879 | B2 | 5/2006 | Ramet | |
| 7,055,683 | B2 | 6/2006 | Bourque et al. | |
| 7,175,614 | B2 | 2/2007 | Gollier et al. | |
| 7,306,095 | B1 | 12/2007 | Bourque et al. | |
| 7,306,371 | B2 | 12/2007 | Perell | |
| 7,597,691 | B2 | 10/2009 | Kawaguchi et al. | |
| 7,644,821 | B2 | 1/2010 | Perell | |
| RE41,273 | E * | 4/2010 | Perell | 383/210 |
| 2002/0094141 | A1 * | 7/2002 | Hoshino | 383/210 |
| 2002/0150658 | A1 | 10/2002 | Morrissette et al. | |
| 2002/0170832 | A1 | 11/2002 | Klair | |
| 2003/0019781 | A1 | 1/2003 | Kocher | |
| 2003/0113519 | A1 | 6/2003 | Wasserman et al. | |
| 2003/0148004 | A1 * | 8/2003 | Kawaguchi et al. | 426/115 |
| 2004/0226848 | A1 | 11/2004 | Dunn-Rankin | |
| 2006/0023976 | A1 | 2/2006 | Alvater et al. | |
| 2007/0235369 | A1 | 10/2007 | Perell | 7/5 |
| 2007/0237431 | A1 | 10/2007 | Perell | |
| 2007/0284375 | A1 | 12/2007 | Perell | |
| 2007/0286535 | A1 | 12/2007 | Perell | |
| 2007/0295766 | A1 | 12/2007 | Perell | |
| 2008/0212904 | A1 | 9/2008 | Perell | |
| 2009/0196675 | A1 * | 8/2009 | May et al. | 401/206 |
| 2009/0263050 | A1 * | 10/2009 | Eberhardt | 383/205 |
| 2010/0150481 | A1 * | 6/2010 | Perell et al. | 383/210 |
| 2010/0206756 | A1 * | 8/2010 | Dunn-Rankin | 206/467 |
| 2010/0326989 | A1 * | 12/2010 | Perell et al. | 220/265 |
| 2011/0006063 | A1 * | 1/2011 | Dunn-Rankin | 220/266 |

FOREIGN PATENT DOCUMENTS

| | | | |
|---|---|---|---|
| EP | 00317130 | A1 | 5/1989 |
| EP | 0709302 | A1 | 5/1996 |
| EP | 2003146364 | | 5/1996 |
| EP | 2002503187 | | 1/2002 |
| FR | 2345363 | A1 | 10/1977 |
| JP | 04215927 | A | 8/1992 |
| JP | 2253605 | A | 9/1992 |
| JP | 7-8236 | | 7/1995 |
| JP | 10287362 | A * | 10/1998 |
| JP | 11029176 | A | 2/1999 |
| JP | 200255598 | A | 9/2000 |
| JP | 2002037327 | | 2/2002 |
| WO | WO 96/23700 | A1 | 8/1996 |
| WO | WO 02/083504 | A1 | 10/2002 |
| WO | WO 2004/100856 | A2 | 11/2004 |
| WO | WO 2005/022323 | A | 3/2005 |
| WO | WO 2005/077811 | A1 | 8/2005 |
| WO | WO2009-086344 | A1 | 7/2009 |
| WO | WO2009-086346 | A1 | 7/2009 |
| WO | WO2009-088759 | A1 | 7/2009 |

OTHER PUBLICATIONS

U.S. Appl. No. 12/434,254, filed May 1, 2009, Package with one or More Access Points for Breaking one or more Seals and Accessing the Contents of the Package.

U.S. Appl. No. 12/704,914, filed Feb. 12, 2010 entitled Package Containing a Breachable Bubble in Combination with a Closure Device.

U.S. Appl. No. 12/703,947, filed Feb. 11, 2010, entitled Package with Unique Opening Device and Process for Forming Package.

* cited by examiner

ACCESS STRUCTURE WITH BURSTING DETONATOR FOR OPENING A SEALED PACKAGE

Matter enclosed in heavy brackets [ ] appears in the original patent but forms no part of this reissue specification; matter printed in italics indicates the additions made by reissue.

*RELATED APPLICATIONS*

*This application is a divisional reissue application filed Aug. 1, 2008 of U.S. patent Reissue application Ser. No. 12/184,809, now U.S. Pat. No. Re. 41,273 which is a reissue application of U.S. Pat. No 7,306,371, filed Dec. 14, 2004, granted Dec. 11, 2007, which is a continuation-in-part of U.S. patent application Ser. No. 10/831,964, filed Apr. 26, 2004, now U.S. Pat. No. 6,938,394, granted Sep. 6, 2005, which is a continuation-in-part of U.S. patent application Ser. No. 10/246,893, filed Sep. 19, 2002, now U.S. Pat. No. 6,726,364, granted Apr. 27, 2004.*

TECHNICAL FIELD

This invention relates to a breaching access structure for a sealed package having a breaching bubble which edge breaches to provide peel flaps for opening the package, and more particularly to such a breaching bubble having a bursting detonator that initiates the breaching.

BACKGROUND

Heretofore, U.S. Pat. No. 6,726,364 to Perell et al teaches a storage package with a band seal formed by opposed laminae enclosing a breaching bubble. The band seal has an inner seal between the bubble and the interior of the package, and an outer seal between the bubble and the edge of the package. The bubble may be expanded by external pressure applied to the bubble by the user. The expansion separates the opposed laminae causing the bubble to breach along the edge. Opposed peel flaps form along the edge breach by the separation of the opposed laminae of the outer seal. These small initial flaps are grasped by the user and manually peeled apart to separate the remainder of the outer seal and the inner seal, and open the package.

SUMMARY

It is therefore an object of this invention to provide an access structure with a bursting detonator within the breaching bubble. Pressure on the bursting fluid within the detonator causes the detonator wall to rupture, initiating the breaching of the bubble. The rupture communicates the high fluid pressure within the bursting detonator into the bubble. This step change in internal bubble pressure urges the laminae toward separation, causing the bubble to edge breach.

It is a further object of this invention to provide such a bursting detonator which ruptures almost instantaneously causing a rapid, sudden and energetic edge breach. As the user presses on the bubble and detonator therein, compression energy builds in the bursting fluid. The external mechanical energy provided by the user, is transformed into internal compression energy. The compression continues to build until released by rupture into the bubble. The bulk of this accumulated energy is instantaneously transferred at burst into the breaching bubble causing the bubble to expand and breech. The slow energy introduction by the user over the entire period of pressing, is released in an instant as an intense pressure pulse.

It is a further object of this invention to provide such a bursting detonator having uniform rupture threshold. That is, the detonators in each package are generally the same size, shape, and wall thickness, and made of the same material. These mass manufactured detonators rupture at about the same fluid pressure. The user's package opening technique is simplified. He merely applies the same pressure at same place in the same manner.

It is a further object of this invention to provide such a bursting detonator with a bursting tract for providing a sponsored rupture. The bursting tract is scored or otherwise weakened, in order to promote rupture.

It is a further object of this invention to provide such a bursting detonator which produces a uniform sound upon bursting.

It is a further object of this invention to provide such a bursting detonator as an inner container for items accompanying the product within the sealed interior. Manufacturers frequently provide product accessories and utensils which are not in the sealed interior with the product, such as prizes and instructions. These items may be included in the bursting detonator.

It is a further object of this invention to provide an access structure with multiple bursting detonators.

Briefly, these and other objects of the present invention are accomplished by providing a breaching access structure having an access region proximate a breaching edge. The structure has a band seal extending thereacross containing a breaching bubble. The band seal has an outer seal portion between the breaching bubble and the breaching edge, and an inner seal portion between the breaching bubble and a sealed interior. A bursting detonator proximate the breaching bubble contains bursting fluid. The detonator bursts in response to applied pressure for establishing fluid communication from the detonator to the breaching bubble. The detonator pressure causes the breaching bubble to breach for facilitating opening the inner seal portion providing access to the interior.

BRIEF DESCRIPTION OF THE DRAWINGS

Further objects and advantages of the access structure having a breaching bubble and bursting detonator, will become apparent from the following detailed description and drawings (not drawn to scale) in which.

Figure 1A:
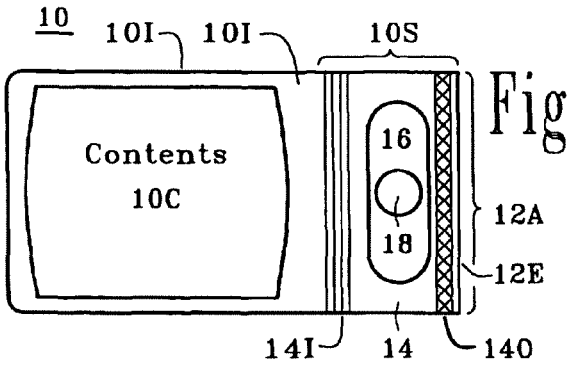
FIG. 1A is a side view of storage package 10 showing stored contents 10C and breaching bubble 16 and bursting detonator 18.

The first digit of each reference numeral in the above figures indicates the figure in which an element or feature is most prominently shown. The second digit indicates related elements or features, and a final letter (when used) indicates a sub-portion of an element or feature.

REFERENCE NUMERALS IN DRAWINGS

The table below lists the reference numerals employed in the figures, and identifies the element designated by each numeral.

Storage Package 10
- 10C Contents 10C
- 10I Sealed interior 10I
- 10S Breaching Access Structure 10S
- 12A Access Region 12A
- 12E Breaching Edge 12E

14 Band Seal 14
- 14I Inner Seal Portion 14I
- 14L Lower Lamina 14L
- 14O Outer Seal Portion 14O
- 14U Upper Lamina 14U

16 Breaching Bubble 16
- 16B Edge Breach 16B
- 16F Separation Frontier 16F
- 16L Lower Peel Flap 16L,
- 16U Upper Peel Flap 16U

18 Bursting Detonator 18
- 18A Anchor Site 18A
- 18F Bursting Fluid 18F
- 20I Sealed interior 20I
- 24I Inner Seal Portion 24I
- 24L Curved Lower Lamina 24L
- 24O Outer Seal Portion 24O
- 24U Curved Upper Lamina 24U

26 Breaching Bubble 26

28 Bursting Detonator 28
- 28P Product Item 28P
- 34F Frangible End of Middle Lamina 34F
- 34L Flat Base Lower Lamina 34L
- 34M Partial Middle Lamina 34M
- 34P Pinned End of Middle Lamina 34P
- 34S Seal of Middle Lamina 34S
- 34U Curved Cover Upper Lamina 34U

36 Breaching Bubble 36

38 Bursting Detonator 38
- 42E Breaching Edge 42E

46 Breaching Bubble 46
- 44L Lower Lamina 44L
- 44U Upper Lamina 44U

48 Binary Detonating Capsule 48
- 48F First Chamber 48F
- 48S Second Chamber 48S

50 Storage Package 50

56 Breaching Bubble 56

58 Bursting Detonator 58

58T Bursting Tract 58T

60 Storage Package 60

66 Breaching Bubble 66

68 Bursting Detonator 68
- 60I Sealed interior 60I
- 60S Access Structure 60S General Embodiment—(FIG. 1A-H)

Breaching access structure 10S provides easy access to contents 10C of sealed interior 101 of storage package 10 through breaching edge 12E which extends along the edge of the access structure. The package is formed by enclosure material, which may be any suitable confining substance such as films, plastics, paper (with wood and/or cotton content) fabric, cellophane, or biodegradable matter. Thin mylar plastic forms a flexible film with hermetic properties, and is commonly used as a enclosure material for packages. Contents 10C may be any tangible object such as snacks, candies, prepared foods, edibles generally, agricultural commodities, pharmaceuticals, sterile supplies and instruments, manufactured products, or sundry household goods.

Access region 12A is within the access structure proximate breaching edge 12E, and provides entrance into the sealed interior and access to the contents. Band seal 14 extends across the access region and is formed by opposed laminae of enclosure material. The band seal has upper lamina 14U and lower lamina 14L pressed into a sealing engagement. Breaching bubble 16 is enclosed between the opposed laminae within the band seal. The band seal has inner seal portion 14I and outer seal portion 14O, both formed by the opposed laminae material. The inner seal portion is between the breaching bubble and the sealed interior. The outer seal portion is between the bubble and breaching edge 12E of the access region. The opposed laminae forming the band seal and the seal portions therein, may be pressed into a sealing engagement, trapping breaching bubble 16 therebetween. The sealing engagement may be frangible, forming a seal which is easily broken without destruction. Such frangible seals may be formed under controlled pressure and temperature and time conditions. A additional details of a suitable access structure are disclosed in U.S. Pat. No. 6,726,364 issued on 27 Apr. 2004 to Perell et al, the subject matter of which is hereby incorporated by reference in its entirety into this disclosure.

Figure 1B:
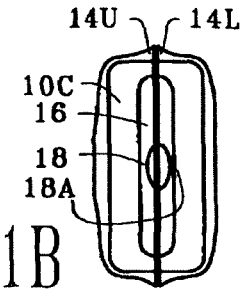
FIG. 1B is a end view of package 10 of FIG. 1A.
Figure 1C:
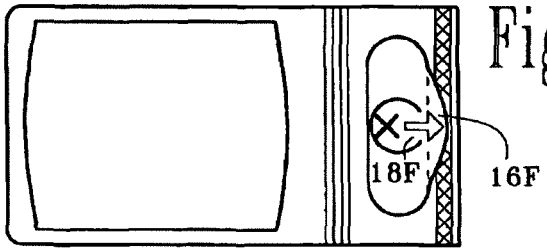
FIG. 1C is a side view of package 10 showing detonator 18 bursting into bubble 16 due to applied pressure at point "X"
Figure 1D:
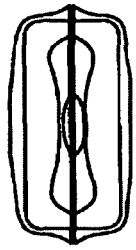
FIG. 1D is a end view of package 10 of FIG. 1C.
Figure 1E:
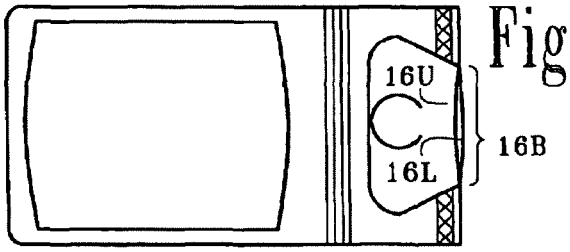
FIG. 1E is a side view of package 10 showing bubble 16 forming edge breach 16B.
Figure 1F:
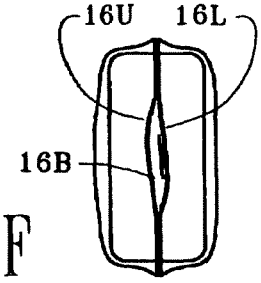
FIG. 1F is a end view of package 10 of FIG. 1E.

Bursting detonator 18 proximate breaching bubble 16, contains bursting fluid 18F. The detonator bursts in response to fluid pressure (either external see FIG. 1B, or internal see FIG. 4) for establishing fluid communication from the detonator to the breaching bubble. The fluid pressure within the detonator is communicated into the breaching bubble, initiating bubble expansion and laminae separation and breaching along breaching edge 12E. The bursting detonator is preferably inside the breaching bubble, and anchored to the inside surface of the breaching bubble. The bursted detonator is shown in FIGS. 1A 1C and 1E at various stages in the opening of the sealed interior. Detonator 18 is shown before bursting in FIG. 1A, during bursting in FIG. 1C, and after bubble breach in FIG. 1E. Anchor site 18A for detonator 18 is shown in FIGS. 1B 1D and 1F at these various stages. The anchored detonator is firmly fixed at the anchor site, and does not slip around within the breaching bubble during bursting. After breach, the bursted detonator stays attached to the lamina, where it cannot be swallowed by an infant or dropped as litter. The bursting detonator may be formed of a stretchable material such as a low density polyethylene, which thins as the detonator spreads-out and flattens or deforms under the fluid pressure. At a critical thinness, the detonator material ruptures along a tear causing the bursting.

Opening the Band Seal

Breaching bubble 16 expands towards breaching edge 12E of the access structure (see FIG. 1C) in response to the fluid pressure released by bursting detonator 18. The bubble is larger than the detonator providing an spreading zone within bubble for the detonator to spread-out, and thin and burst. In the embodiment shown in FIG. 1A-H, the bursting is accomplished by external pressure applied by the user. The user may direct the bubble expansion outward towards edge 12E of the package by applying the external pressure along the inward side of the detonator proximate point "X" (see FIG. 1C). Inward expansion of the bubble towards inner seal 14I is limited, because the applied external pressure keeps the opposed laminae pressed together in sealing engagement along the inward side. Therefore, expansion due to the directed pressure is primarily outward towards outer seal 14O, and urges the bubble expansion outward towards the edge of the package, as indicated by the large outward arrow.

The outward bubble expansion progressively separates the outer seal laminae along a moving separation frontier 16F. The frontier moves across the outer seal until the frontier reaches the edge of the package, where the bubble breaches creating edge breach 16B (see FIG. 1E and FIG. 1F). The outer seal may be a frangible seal, suitable for breaching. Minor leakage of bubble air or fluid during the shelf life of the package may be tolerated. The bursting pressure from the detonator during burst compensates for the leakage. The pre-bursting pressure applied to the bursting detonator also causes pressure in the surrounding breaching bubble. During this short pre-burst stage, the bubble becomes taut and firm, and primed against the separation frontier. The bubble may expand and the separation proceed, in response to both the detonator bursting and the prebursting pressure in the bubble.

Opposed Peel Flaps

Opposed pair of peel flaps, upper flap 16U and lower flap 16L (see FIG. 1E), are formed by the separated opposed laminae of the outer seal along the edge breach as the bubble breaches. These small initial flaps are grasped by the user and manually peeled apart, further separating the opposed laminae in order to initiate opening the inner band seal providing access to the interior. The opposed laminae material forming the bubble and the outer seal may stretch slightly under the bursting pressure and bubble expansion. Enclosure material of a stretching plastic type such as mylar provides loose or baggy initial peel flaps (see FIG. 1F). The looseness offers the user more gripping material to start peeling the flaps apart.

Figure 1G:
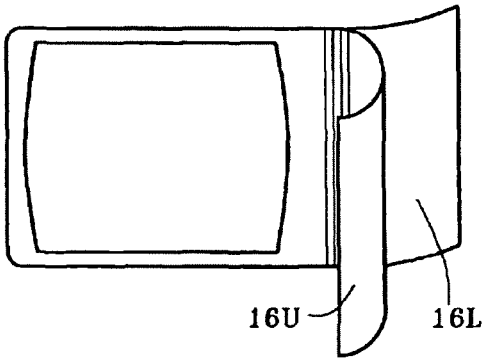
FIG. 1G is a side view of package 10 showing peel flaps 16U and 16L being peeled back to open sealed interior 10I.
Figure 1H:
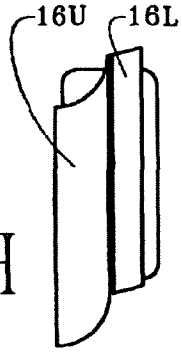
FIG. 1H is a end view of package 10 of FIG. 1G.

The initial peel flaps formed along the edge breach become larger in area as the user peels the flaps apart (see FIG. 1G and FIG. 1H). This enlarged area first includes some of the opposed laminae material forming the outer seal. As the flaps are peeled further apart, the enlargement includes some of the opposed laminae material forming the bubble, and then some of the material forming the inner seal. This enlarged flap area offers the user an even more material to grip as the laminae separation proceeds. The uniform, page-like peeling shown in FIG. 1G illustrates ideal separation of the laminae. The actual peeling may be uneven, irregular, or askew. The opposed laminae material forming the inner seal may be resealable to permit resealing the interior after the band seal has been opened.

The bubble expands under the pressure both outward towards edge 12E of the access structure and laterally, as indicated by the small lateral arrows (see FIG. 1C). The lateral expansion provides a laterally expanded edge breach with laterally expanded peel flaps. Instead of the directed pressure shown in FIG. 1C, the user may press the detonator closer to the center of the bubble, causing the bubble to expand in all directions. The bubble may expand under the pressure both outward towards the edge and inward towards the inner seal.

Figure 2:
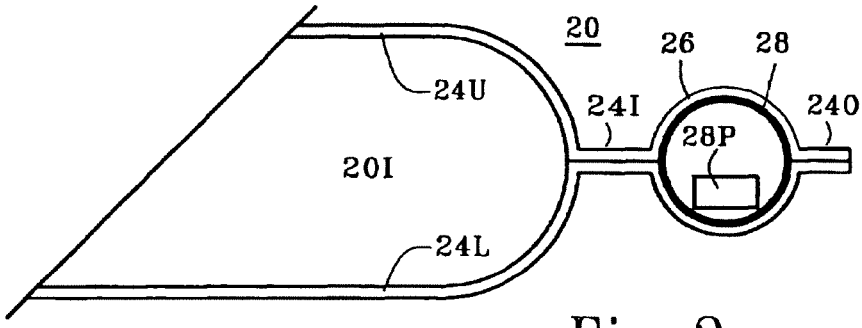
FIG. 2 is a sectional view of a convex package 20.

Convex Embodiment—(FIG. 2)

One or both of the opposed laminae may be generally convex, such as curved lower lamina 24L and curved upper lamina 24U (see FIG. 2). The opposed laminae may be pressed together along the edges, and along the band seal to form outer seal 24O and inner seal 24I. The space between the curved lamina and within the pressed edges defines breaching bubble 26 and sealed interior 20I. Bursting detonator 28 (shown in bold line) may completely fill the breaching bubble. Alternatively, as shown in FIGS. 1A-H, bursting detonator 18 only partially fills breaching bubble 16.

Product Items

The bursting detonator or the breaching bubble may contain small, useful product items, such as tokens, coupons, candy, utensils fragrances, etc. Item 28P may be product information such as instructions, manufacturing data, and use-by-date, expressed in various formats, such as print, bar codes and graphics. The information may be carried on various mediums such, paper and memory chips, and even on CDs. The product item may be a status indicator, to indicate such conditions as whether:

1) The contents have been stored at a temperature outside a critical range. That is, the storage environment was temporarily too warm or too cold.
2) The contents have been exposed to the ambient, and degraded by oxygen. The contents are no longer fresh.
3) The package or seal has been damaged, degraded or tampered with.
4) The use-by-date of the contents has expired.

Figure 3:
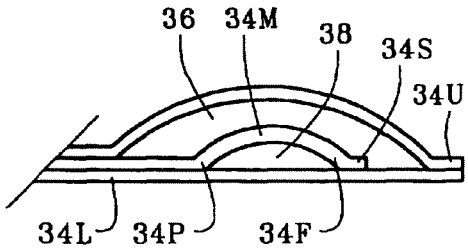
FIG. 3 is a sectional view of a planar package 30.

Planar Embodiment—(FIG. 3)

One of the opposed laminae may be generally planar, such as flat base 34L. The other opposed lamina may be generally convex, such as curved cover 34U. The flat base provides a moving assembly platform during manufacturing, which then receives the other components of the storage package. Bursting detonator 38 may be anchored to the flat base prior to mounting the curved cover. In addition, the flat base may receive a partial lamina film forming the detonator. Partial middle lamina 34M, between the opposed laminae, extends into breach bubble 36 to form bursting detonator 38. Pinned end 34P of middle lamina 34M is pinned between upper lamina 34U and lower lamina 34L. Frangible end 34F within the bubble is secured only to the lower lamina forming frangible detonator seal 34S. Lamina detonator 38 expands under pressure causing the middle lamina to separate from the lower lamina and edge breach into the bubble along the detonator seal.

Detonator Fluid

The bursting fluid contained within the bursting detonator may be any suitable compressible gas. Inert and chemically pure gases, such as nitrogen gas are preferred. Low cost ambient air may be employed as the bursting fluid. Preferably, the air is filtered to remove harmful particulate matter, such as pathogens, dust, and allergens. Alternatively, the bursting fluid may be any suitable incompressible liquid such as water or solvent. The bursting fluid may be a low-temperature gel substance which remains plastic and malleable at freezer temperatures. Frozen food packages taken right out of the freezer, may be opened immediately by bursting such a gel detonator.

Fluid substances with a low coefficient of thermal expansion may be employed. These substances exhibit less contraction or expansion as the temperature changes. Because of the lower shrinkage, the detonator remains firmer at lower temperatures. Such a firm detonator has a crisp, more reliable response to fluid pressure. In addition, low coefficient substances exhibit less expansion at higher temperatures, which may force the detonator into an untimely burst.

Figure 4:
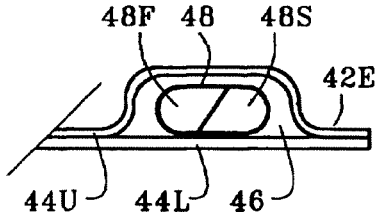
FIG. 4 is a side view of binary bursting detonator 48 within package 40.

Internal Pressure—(FIG. 4)

In the embodiment of FIG. 1, the pressure which bursts the detonator is external pressure applied manually by the user. In other embodiments, the pressure for bursting the detonator may be internal gas pressure created within the detonator by chemically active reagents. Binary detonating capsule 48 contains a first reagent such as liquid vinegar in first chamber 48F, and a second reagent such as baking soda powder in second chamber 48S. The capsule is formed of a rigid, fragile material, which and may be fractured or crushed under the fluid pressure or mechanical bending, generated by distorting breaching bubble 46. The reagents come into contact and react, generating an expanding volume of gas, which in the vinegar/soda example is carbon dioxide. The internal gas pressure causes opposed laminae 44L and 44U to separate and breach along edge 42E. This internal expansion may be assisted by a cooperating external pressure applied by the user. In this cooperating case, the presence of the internal pressure reduces the external pressure required. In the capsule embodiment of FIG. 4, the bursting detonator is loose inside the breaching bubble, and may be retrieved from the breaching bubble after breach. This loose detonator embodiment does not require the manufacturing step of anchoring the detonator, and the detonator is free to move around within the bubble.

Figure 5:
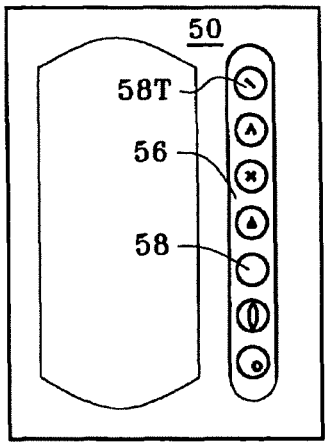
FIG. 5 is a top view of package 50 showing multiple bursting detonators 58 each with a bursting tract 58T.
Figure 6:
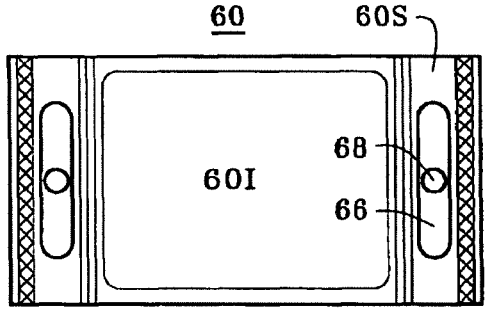
FIG. 6 is a top view of package 60 showing multiple breaching bubbles 66 with bursting detonators 68.

Multiple Bubbles/Detonators—(FIGS. 5 and 6)

The breaching access structure may have multiple breaching bubbles, each with one or more bursting detonator. Breaching bubble 56 on storage package 50 contains more than one bursting detonator 58. If one of the detonators fails, the other detonator is available as a back-up. Access structure 60S on storage package 60 has multiple breaching bubbles 66, each with a detonator 68. One breaching bubble with an inner seal and an outer seal is positioned at one end of sealed interior 60I. Another breaching bubble with an inner seal and an outer seal is positioned at the other end of the sealed interior. The sealed interior may be opened from either end.

Bursting Tract—(FIG. 5)

The bursting detonator may have a bursting tract defined in the material of the detonator for providing a sponsored rupture of the detonator at the tract. The sponsored rupture may have a lower rupture threshold than the remainder of the detonator, increasing the probability that the rupture will occur within the tract. The material forming the tract may be more fragile and/or thinner than the material forming the remainder of the detonator, and therefore more prone to breaking or splitting. The material forming the fragile tract may be chemically treated to become more brittle, or otherwise damaged or flawed.

The thinner tract may be a score in the surface of the detonator. Various embodiments of scored bursting tracts 58T within bursting detonators 58, are shown in FIG. 5. The score may be a simple line score inscribed on the detonator by a spot laser beam. For example, a bursting detonator having a 1.5 mil wall thickness may be reduced to the wall thickness to 1 mil along the score by employing a low power laser beam having a diameter of about one half a human hair. The score may be an angular score such as an acute angle or an "X" or a triangle, defining a high stress rupture point at the vertex. Alternativley, the score may be a closed loop score such as a circle or an oval. The direction of the sponsored rupture may be controlled to promote the edge breach of the breaching bubble. The detonator may be orientated to position the score adjacent to the edge breach location, causing most of the energy of the rupture to be applied to separating the opposed laminae. The sponsored conditions of the rupture establish a more predictable bursting, resulting in a more uniform sound created by the rush of breaching fluid.

*Audio/tactile Feedback*

*The bubble may provide a distinct breaching sound when an edge is breached indicating that the bubble has breached, and the outer seal has been opened by the expansion of the bubble. A sound inherently comes with bubble breaching. The breaching sound is caused by the rush of air under applied pressure escaping from the bubble through the edge breach during breaching. A large bubble may provide a solid popping sound similar to a small balloon popping. In contrast, small bubbles may just "peep" or whistle sound. A bubble may have a residual internal pressure greater than ambient external pressure to breach faster and provide a firmer bubble with a crisper breaching sound. Soft, spongy bubbles breach slower and make a flatter sound. An "odd" breaching sound, different from the usual sound, may indicate a failing or tampered seal.*

CONCLUSION

It will be apparent to those skilled in the art that the objects of this invention have been achieved as described hereinbefore by providing a bursting detonator within a breaching access structure. Various changes may be made in the structure and embodiments shown herein without departing from the concept of the invention. Further, features of embodiments shown in various figures may be employed in combination with embodiments shown in other figures. Therefore, the scope of the invention is to be determined by the terminology of the following claims and the legal equivalents thereof.

I claim:

[1. A breaching access structure for providing easy access to the contents of a sealed interior, comprising:

breaching edge along the edge of the access structure;

access region within the access structure proximate a breaching edge;

band seal extending across the access region;

breaching bubble within the band seal;

outer seal portion of the band seal, between the breaching bubble and the breaching edge of the access structure;

inner seal portion of the band seal, between the breaching bubble and the sealed interior; and bursting detonator containing bursting fluid proximate the breaching bubble, which detonator bursts in response to applied pressure for establishing fluid communication from the detonator to the breaching bubble, causing the breaching bubble to breach for facilitating opening the inner seal portion providing access to the interior.]

[2. The access structure of claim 1, wherein the bursting detonator is inside the breaching bubble.]

[3. The access structure of claim 2, wherein the bursting detonator is anchored inside the breaching bubble.]

[4. The access structure of claim 3, wherein the bursting detonator is retrievable from inside the breaching bubble after breach.]

[5. The access structure of claim 2, wherein the bursting detonator completely fills the breaching bubble.]

[6. The access structure of claim 2, wherein the bursting detonator partially fills the breaching bubble.]

[7. The access structure of claim 2, wherein the bursting detonator is loose inside the breaching bubble.]

[8. The access structure of claim 7, wherein the bursting detonator is retrievable from inside the breaching bubble after breach.]

[9. The access structure of claim 1, wherein the bursting detonator is formed of a stretchable material which bursts by thinning under the applied pressure.]

[10. The access structure of claim 1, wherein the bursting detonator is formed of a rigid material which bursts by fracturing under the applied pressure.]

[11. The access structure of claim 1, wherein the applied pressure for bursting the detonator is external pressure.]

[12. The access structure of claim 1, wherein the applied pressure for bursting the detonator is created within the detonator by chemically active reagents.]

[13. The access structure of claim 1, wherein the bursting fluid is a gas.]

[14. The access structure of claim 13, wherein the bursting fluid is nitrogen gas.]

[15. The access structure of claim 13, wherein the bursting fluid is ambient air.]

[16. The access structure of claim 13, wherein the bursting fluid is a liquid.]

[17. The access structure of claim 13, wherein the bursting fluid is a gel substance which remains malleable at low temperatures.]

[18. The access structure of claim 1, further comprising an item contained in the bursting detonator.]

[19. The access structure of claim 18, wherein the item contained in the bursting detonator is information.]

[20. The access structure of claim 18, wherein the item contained in the bursting detonator is a status indicator.]

[21. The access structure of claim 1, wherein the breaching bubble contains more than one bursting detonator.]

[22. The access structure of claim 1, wherein the breaching bubble is multiple breaching bubbles.]

[23. The access structure of claim 22, wherein a breaching bubble with an inner seal and an outer seal is positioned at one end of the sealed interior, and another breaching bubble with an inner seal and an outer seal is positioned at the other end of the sealed interior.]

[24. A breaching access structure for providing easy access to the contents of a sealed interior, comprising:

breaching edge along the edge of the access structure;

access region within the access structure proximate a breaching edge;

band seal extending across the access region;

breaching bubble within the band seal;

outer seal portion of the band seal, between the breaching bubble and the breaching edge of the access structure;

inner seal portion of the band seal, between the breaching bubble and the sealed interior;

bursting detonator containing bursting fluid proximate the breaching bubble, which detonator bursts in response to applied pressure for establishing fluid communication from the detonator to the breaching bubble, causing the breaching bubble to breach for facilitating opening the inner seal portion providing access to the interior; and a bursting tract defined in the material of the bursting detonator for providing a sponsored rupture of the detonator at the tract.]

[25. The access structure of claim 24, wherein the sponsored rupture at the tract is directional.]

[26. The access structure of claim 24, wherein the sponsored rupture at the tract has a lower rupture threshold than the remainder of the detonator.]

[27. The access structure of claim 24, wherein the tract is more fragile than the remainder of the detonator.]

[28. The access structure of claim 27, wherein the material forming the fragile tract is a thinner than the material forming the remainder of the bursting detonator.]

[29. The access structure of claim 28, wherein the thinner tract is a score in the surface of the detonator.]

[30. The access structure of claim 29, wherein the score is a laser score.]

[31. The access structure of claim 29, wherein the score is a line score.]

[32. The access structure of claim 29, wherein the score is an angle score defining a high stress point at the vertex.]

[33. The access structure of claim 29, wherein the score is a closed loop score.]

[34. A breaching access structure for providing easy access to the contents of a sealed interior, comprising:

breaching edge along the edge of the access structure;

access region within the access structure proximate a breaching edge;

band seal extending across the access region;

breaching bubble within the band seal;

outer seal portion of the band seal, between the breaching bubble and the breaching edge of the access structure;

inner seal portion of the band seal, between the breaching bubble and the sealed interior;

the band seal and the outer seal portion and inner seal portion are formed by opposed laminae of flexible material pressed into a sealing engagement, and the breaching bubble is between the opposed laminae; and bursting detonator containing bursting fluid proximate the breaching bubble, which detonator bursts in response to applied pressure for establishing fluid communication from the detonator to the breaching bubble, causing the breaching bubble to breach for facilitating opening the inner seal portion providing access to the interior.]

[35. The access structure of claim 34, wherein the sealing engagement is a frangible.]

[36. The access structure of claim 34, wherein the breaching bubble expands towards the breaching edge of the access structure in response to the detonator bursting, and separates the opposed laminae along the outer seal causing the breaching bubble to breach.]

[37. The access structure of claim 34, wherein the breaching bubble expands towards the breaching edge of the access structure in response to the applied pressure and detonator bursting, and separates the opposed laminae along the outer seal causing the breaching bubble to breach.]

[38. The access structure of claim 37, further comprising opposed peel flaps formed by the separated opposed laminae, which may be peeled apart further separating the opposed laminae to open the inner band seal providing access to the interior.]

[39. The access structure of claim 34, wherein one of the opposed laminae is generally planar.]

[40. The access structure of claim 39, wherein the bursting detonator is anchored to the planar lamina.]

[41. The access structure of claim 34, wherein at least one of the opposed laminae is convex.]

[42. The access structure of claim 34, further comprising a partial middle lamina between the opposed laminae, which forms the bursting detonator within the breaching bubble.]

*43. A system for containing contents comprising:*

*a sealed chamber formed of a flexible material and having a sealed edge all around the chamber, the sealed edge including an inner seal portion;*

*at least one bubble contained in said sealed edge located distanced from, outside and separate from the inner seal portion and an outer seal portion;*

*said bubble filled with a fluid;*

*said chamber capable of containing contents;*

*said contents being accessible in said chamber through said bubble by applying pressure to said at least one bubble such that when said at least one bubble is popped, said fluid is exposed to ambient conditions while said chamber remains sealed and said chamber can be opened to access said contents in the chamber.*

*44. The system of claim 43 wherein when said at least one bubble is popped, there is at least one clearly audible pop.*

*45. The system of claim 44 wherein the pop signifies that the contents of the package are fresh.*

*46. The system of claim 44 wherein the pop signifies that the package was sealed and had not been tampered with.*

*47. The system of claim 43 wherein the popping indicates that the contents have been sealed prior to opening said sealed chamber.*

*48. The system of claim 43 wherein said bubble contains one of a coupon, token, prize, fragrance, and sample of a product.*

*49. The system of claim 43 wherein said bubble contains one of a paper, a CD, and a memory chip.*

*50. A system of providing a product using a sealed package in which the package is openable by popping a bubble that forms a separate part of the package, said sealed package having a sealed edge that includes an inner seal portion, said bubble being distanced from, located outside and separate from the inner seal portion and an outer seal portion, wherein popping said bubble exposes said bubble to ambient conditions while said product remains sealed, and wherein said product is accessible through said popped bubble.*

*51. The system of claim 50 in which the package is unsealed but not damaged when the bubble is popped.*

*52. A sealed product package having contents, said sealed product package having a sealed edge including an inner seal, said package being openable by using fluid contained in a bubble which is a separate part of said package to unseal and allow the contents of the package to be accessed without damaging the package and said contents, said bubble being located distanced from, outside and separate from the inner seal portion and an outer seal portion, wherein unsealing of said bubble exposes said fluid to ambient conditions while said contents remains sealed, and wherein said contents is accessible through said unsealed bubble.*

*53. A system of offering a product comprising:*

*a package for containing a product, said package having a sealed edge, the sealed edge including an inner seal portion;*

*at least one bubble located distanced from, outside and separate from the inner seal portion in said sealed edge and an outer seal portion, said bubble sealed from said product when no pressure is being applied to said system; and*

*said product capable of being accessed when said at least one bubble is popped, wherein popping said bubble exposes said bubble to ambient conditions while said product remains sealed, and wherein said product is accessible through said popped bubble.*

* * * * *